Jan. 17, 1956 H. P. LUHN 2,731,196

SELF-CHECKING NUMBER PUNCH

Filed Nov. 14, 1951 6 Sheets-Sheet 1

INVENTOR
HANS P. LUHN

BY Charles E. McTiernan
ATTORNEY

Jan. 17, 1956 H. P. LUHN 2,731,196

SELF-CHECKING NUMBER PUNCH

Filed Nov. 14, 1951 6 Sheets-Sheet 2

INVENTOR
HANS P. LUHN

BY Charles E. McTiernan

ATTORNEY

INVENTOR
HANS P. LUHN
BY Charles E. McTiernan
ATTORNEY

Jan. 17, 1956 H. P. LUHN 2,731,196

SELF-CHECKING NUMBER PUNCH

Filed Nov. 14, 1951 6 Sheets-Sheet 4

INVENTOR
HANS P. LUHN

BY Charles E. McTiernan
ATTORNEY

INVENTOR
HANS P. LUHN

BY Charles E. McTiernan
ATTORNEY

INVENTOR
HANS P. LUHN
BY Charles E. McTiernan
ATTORNEY

United States Patent Office 2,731,196
Patented Jan. 17, 1956

2,731,196

SELF-CHECKING NUMBER PUNCH

Hans P. Luhn, Armonk, N. Y., assignor to International Business Machines Corporation, New York, N. Y., a corporation of New York Application November 14, 1951, Serial No. 256,310

12 Claims. (Cl. 235—58)

Figure 1A:
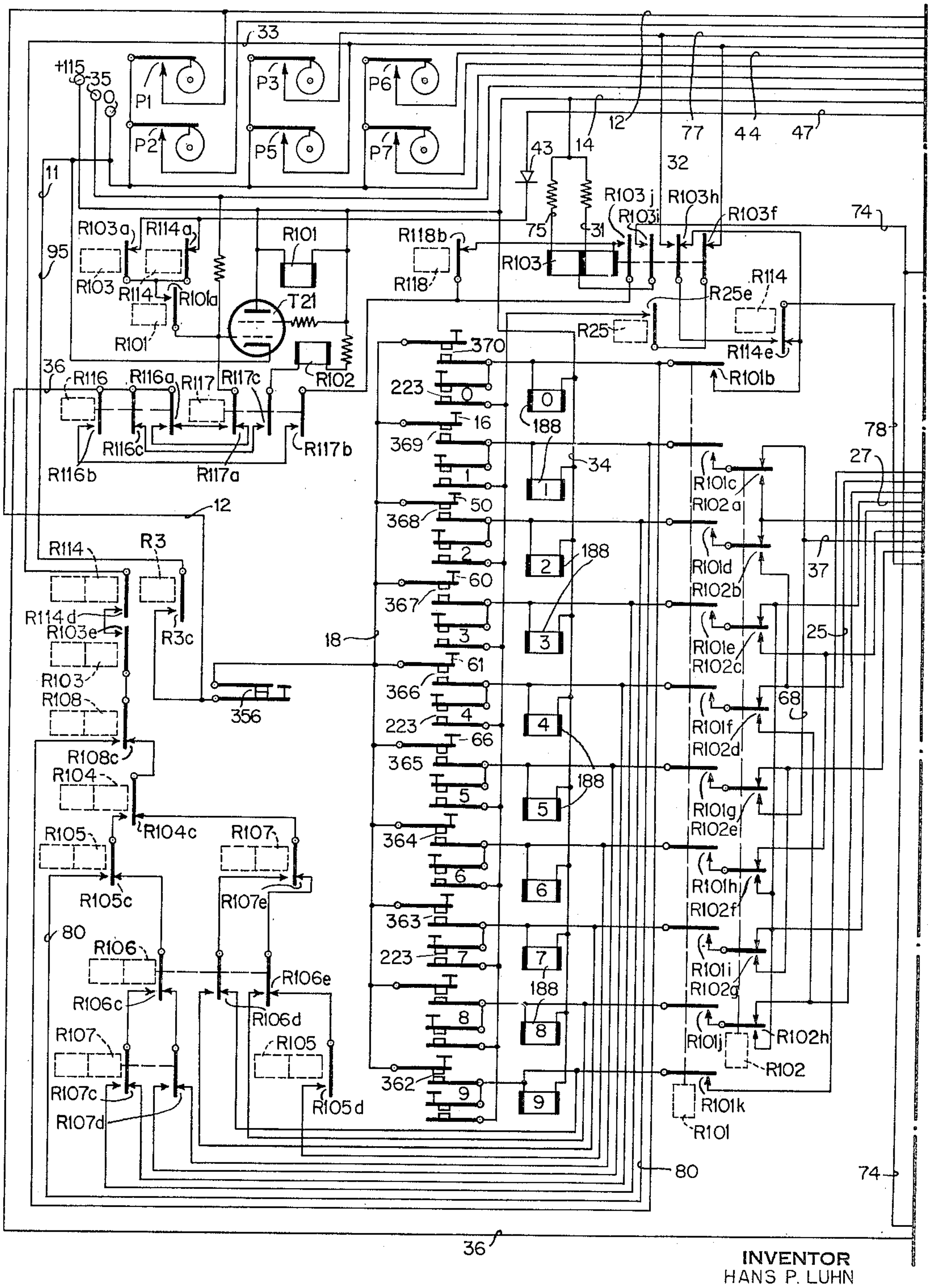

The invention relates in general to a punching device and more specifically to apparatus for either preparing a self-checking serial number or for verifying previously prepared serial numbers.

The principal object of the invention is to provide apparatus for accurately recording special data in a record card.

Another object of the invention is to provide means for preparing any number as a self-checking number.

A further object of the invention is to provide apparatus for determining the correctness of prepared serial numbers.

Still another object of the invention is to provide means for appending a key or check digit to an existing number to prevent the number from being altered or transposed in subsequent operations.

In carrying out the invention, the value of the key or check digit which is appended to the original number is selected so that upon cross addition of all the digits of the number plus the key digit, in accordance with a rule of substitution, the result will be zero with tens cast out in a manner such as described in the applicant's copending application, filed April 18, 1950, Serial No. 156,692, now Patent No. 2,661,896.

In accordance with the rule of substitution mentioned, the units and alternate digits of the original number are replaced by so-called substitute digits according to the following table:

| | | | | | | | | | | |
|---|---|---|---|---|---|---|---|---|---|---|
| Original digit | 0 | 1 | 2 | 3 | 4 | 5 | 6 | 7 | 8 | 9 |
| Substitute digit | 0 | 2 | 4 | 6 | 8 | 1 | 3 | 5 | 7 | 9 |

Taking a number, such as 257348, for example, and making the substitution, we have:

| | | | | | | |
|---|---|---|---|---|---|---|
| Original number | 2 | 5 | 7 | 3 | 4 | 8 |
| Substitute number | 2 | 1 | 7 | 6 | 4 | 7 |

Cross adding the digits of the substitute number with tens cast out, the tens complement of the resulting digit is the key or check digit to be appended to the original number. Thus, the cross addition with tens cast out is 7, whose tens complement is the key digit 3, so that the original number with its key 3 may be recorded as 2573483.

From the foregoing, it will be apparent that upon cross addition of the digits of the original number with substitutions made as before and the key digit included in the addition, the result will be zero. If the result is other than zero, it is an indication of an error in the handling of the digits of the original number and the punch will be locked.

A still further object of the invention is to provide means for automatically originating a key or check digit for any number.

Other objects of the invention will be pointed out in the following description and claims and illustrated in the accompanying drawings, which disclose, by way of examples, the principle of the invention and the best mode, which has been contemplated, of applying that principle.

Figure 1B:
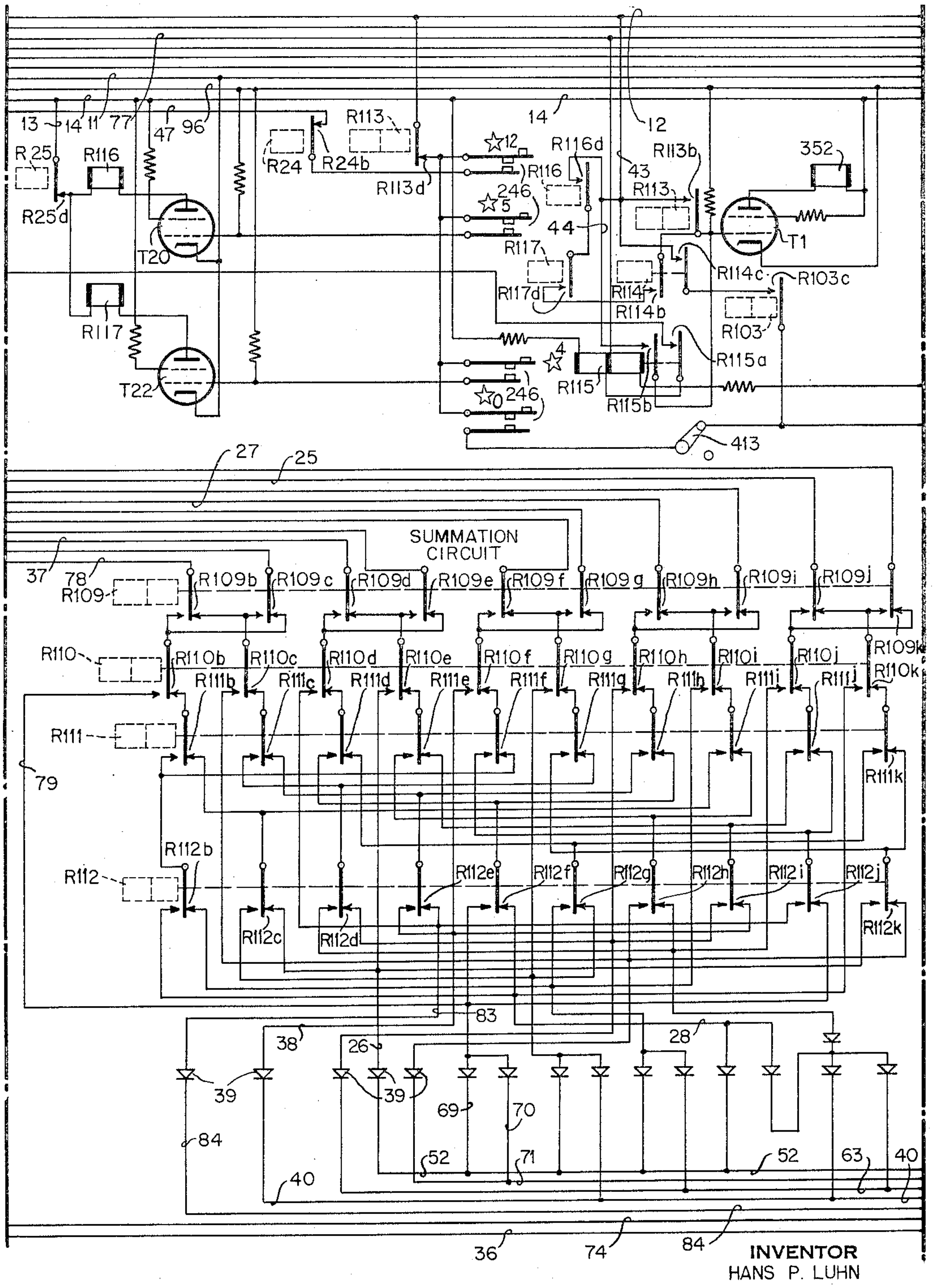
Figure 1C:
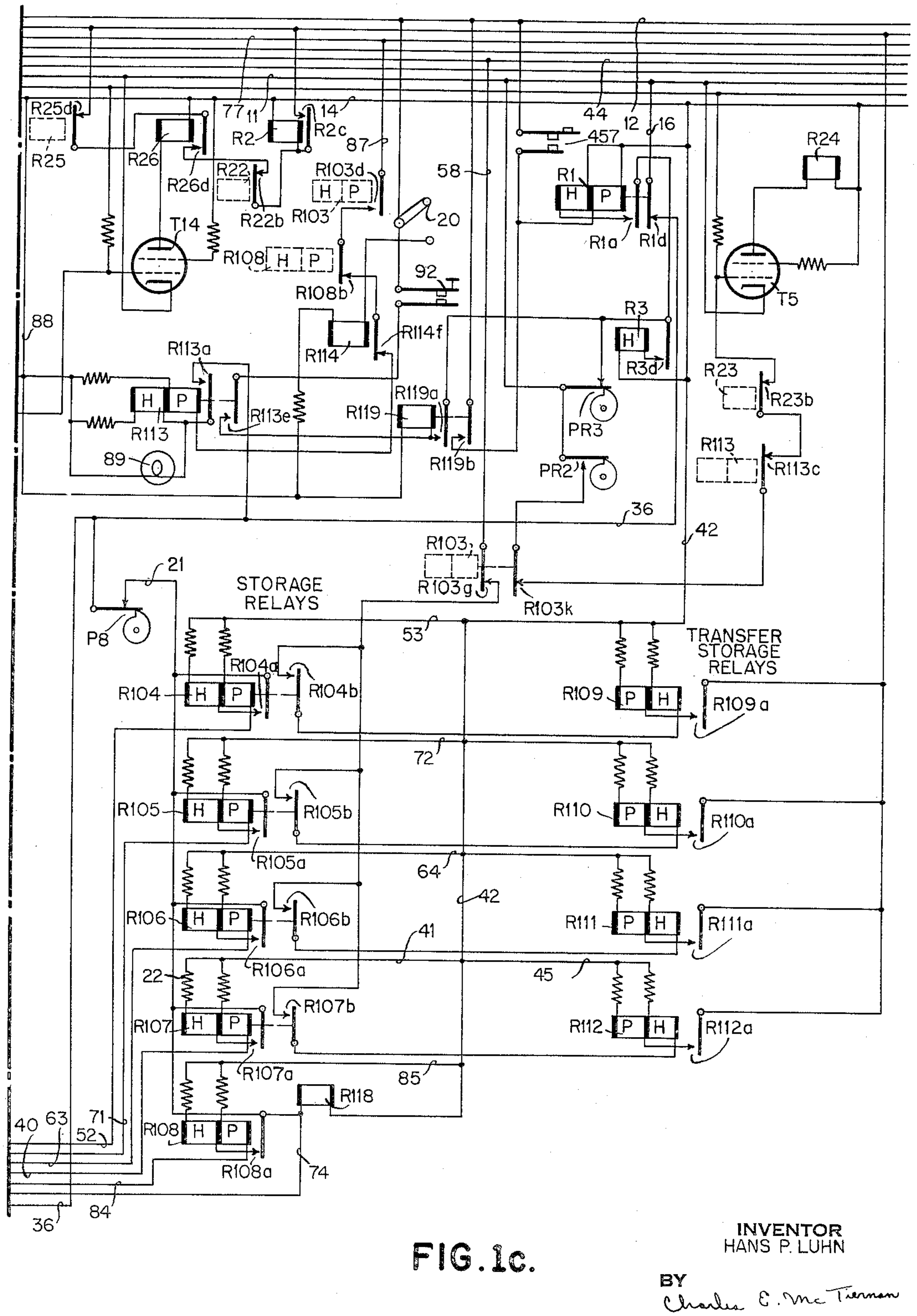
Figure 2A:
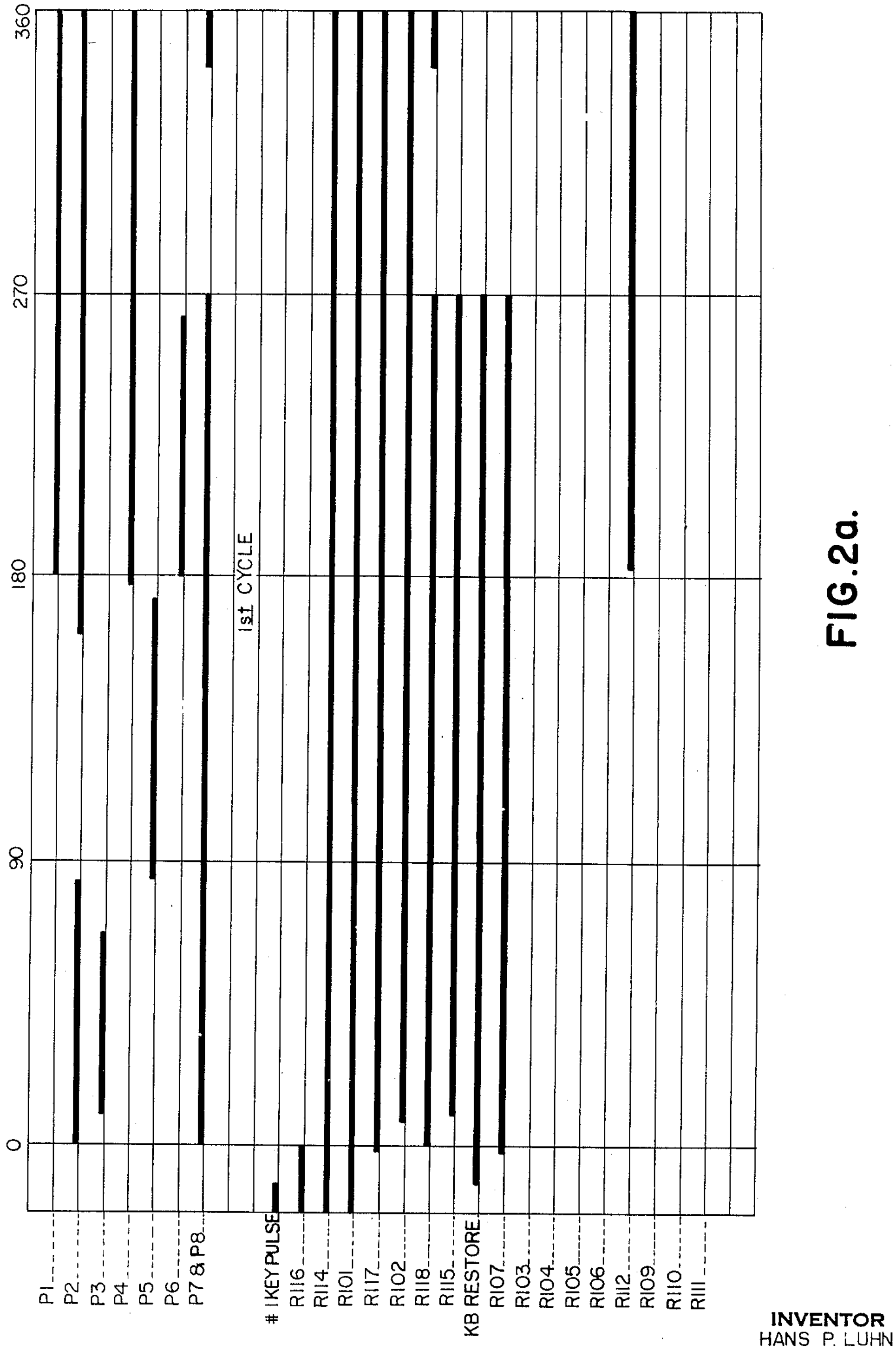
Figure 2B:
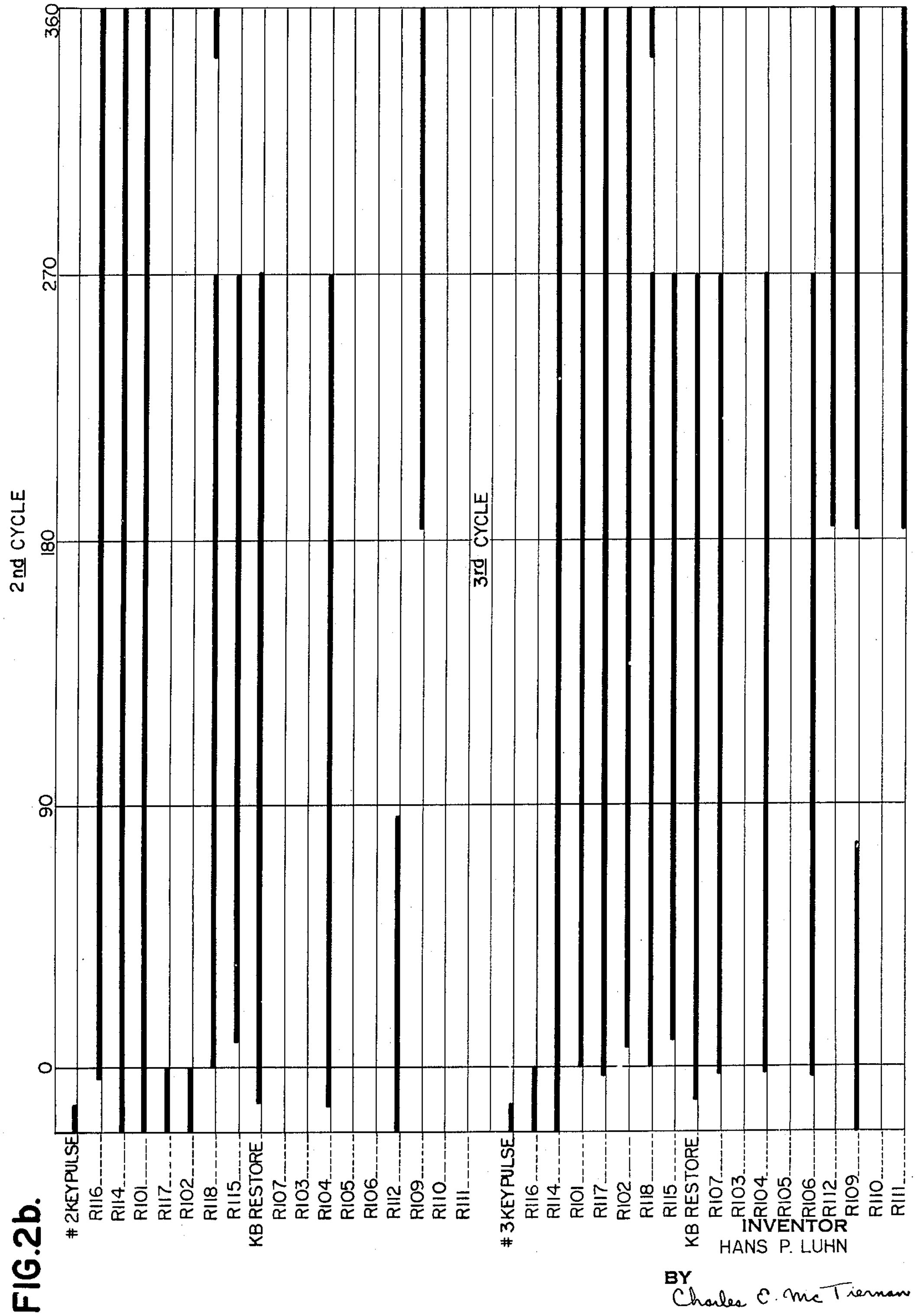
Figure 2C:
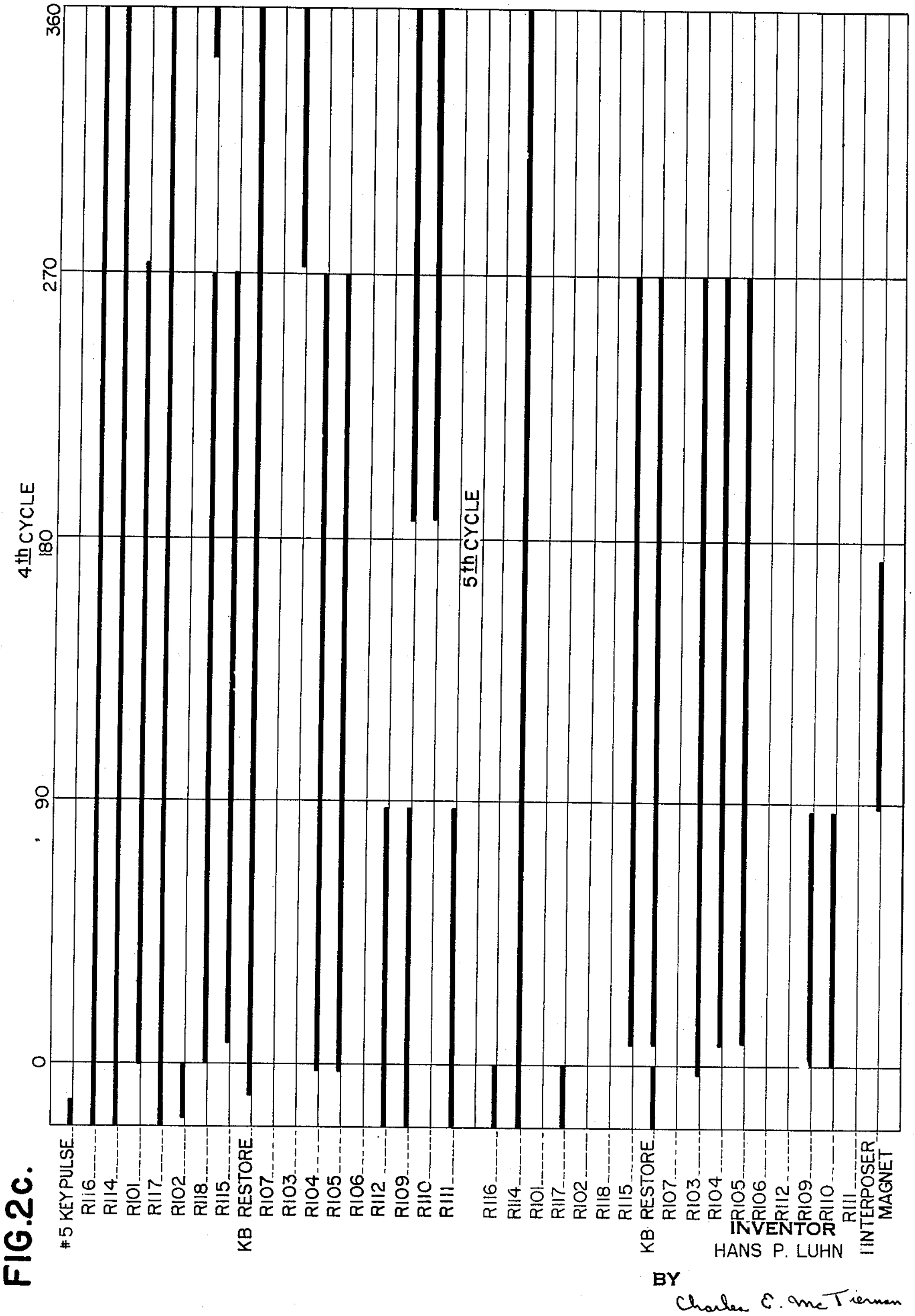

In the drawings:

Figures 1*a*, 1*b* and 1*c* disposed in a horizontal fashion constitute a wiring diagram of the apparatus; and Figures 2*a*, 2*b* and 2*c* disposed in a vertical fashion in the order named represent a timing diagram for an assumed problem.

The mechanical arrangement of the card feeding mechanism, card reading mechanism, the escapement mechanism, and the punching mechanism used in conjunction with the present invention is substantially the same as that found in the commercial machine known as the "IBM Card Punch, Type 024," which is also described and claimed in patent application Serial No. 103,224, of E. W. Gardinor et al., filed July 6, 1949, which issued as Patent 2,647,581 on August 4, 1953. In view of this fact, the mechanism of the aforementioned patent application will be but briefly explained here and in only as much detail as is necessary for an understanding of the present invention, and reference may be had to the aforementioned patent application for a further detailed explanation. Also in those instances where mention is made of elements present in the Gardinor application, reference characters used in said application will be used. Attention is also directed to the fact that any relay or relay contacts mentioned herein and bearing a reference symbol below R101 will find its equivalent in the Gardinor application. Likewise any tube bearing a reference symbol below T20 will be found in the Gardinor circuit diagram.

Before going into the details of the circuit herein disclosed, it may be noted that certain portions of the Gardinor circuit depicted herein differ in minor respects from the corresponding portion of the Gardinor application although these differences do not result in any different function for that portion of the circuit. These differences represent minor refinements that have been added to show the actual circuit as used with the present invention. It is to be understood, of course, that similar circuits may be employed without departing from the novel subject matter herein disclosed.

It is believed that the present invention may be best set forth by describing the invention as actually employed with the machine of the aforementioned application. In those instances where the circuit elements of the aforementioned application become effective in conjunction with the circuit arrangement of the present invention, the reference numbers used to identify such circuit elements in the aforementioned application will be used.

It is also believed that the applicant's circuit arrangement can be best described in reference to a specific problem in which the key or check number is originated. Let it be assumed that it is desired to originate the key number of a postal money order bearing the serial number 1235, which operation should produce a check or key digit 1 in the units digit position of the serial number. Likewise let it be assumed that the program card is standing in column one position having the "5" index position perforated. It is to be noted that this program card operates in a manner similar to the program card shown in Figure 49 of the Gardinor application, now Patent 2,647,581.

The program card for the problem assumed will have the index positions "12" and "4" perforated in the second column, the index positions "12" and "5" perforated in the third column, the index positions "12" and "4" in the the fourth column, and the index positions "12," "4" and "5" perforated in the fifth column. If the serial number assumed had called for the size of a field equal to an even number of columns, which includes the key digit, then the first column of the program card must have the "4" index position perforated, the second column must have the "12" and "5" index positions perforated, the third column must have the "12" and "4" index positions perforated, and the fourth column must have the "12," "4" and "5" index positions perforated.

Now continuing with the assumptions being made with regard to the specific problem, the detail card is registered at the zero column position in a manner such as described in the Gardinor application, now Patent 2,647,581. Inasmuch as it is desired to originate a key or check number, the switch 20 (Fig. 1*c*) will be closed thereby causing the relay R114 (Fig. 1*c*) to be energized. The relay R114 will remain energized as long as the switch 20 is in a closed position. In the problem assumed the switch 20 remains closed until after the key digit is originated. As shall be described subsequently, the switch 20 in its open position conditions the circuit for checking the accuracy of a previously prepared serial number having appended thereto a key or check digit. Thus with the program card standing in the column one position, the "5" perforated index position will permit the #5 star-wheel (245 in Fig. 26 of the Gardinor application) to close the associated contacts 246 (Fig. 1*b*). The closing of contacts 246 will enable a circuit to be established which may be traced as follows: conductor 11 (Fig. 1*a*) coupled to the low side or 0 volt line of a power supply source (not shown), conductor 95, the card lever contacts R3*c* now closed, line 12 (Figs. 1*a* to 1*b*), error relay contacts R113*d* normally closed, #5 star-wheel contacts 246 now closed, the negatively biased control grid of the tube T20, the anode of the tube T20, relay R116, contacts R25*d* normally closed, conductor 13, to the positive line 14 of the 115 volt power supply source. The tube T20 is negatively biased through the coupling of its control grid to the conductor 96 which is coupled to a −35 volt power source (not shown). This circuit upon being completed will cause the tube T20 to be rendered conductive which, in turn, results in the relay R116 being energized. The energization of relay R116 will transfer the associated contacts R116*a* (Fig. 1*a*) causing a circuit to be established for rendering the negatively biased tube T21 (Fig. 1*a*) conductive which, in turn, will cause the relay R101 (Fig. 1*a*) to be energized. This circuit may be traced as follows: conductor 11 (Fig. 1*c*), conductor 16, release relay contacts R1*d* as shown, line 36 (Figs. 1*c* to 1*a*), R116*a* transferred, R117*a* as shown, control grid of the negatively biased tube T21, the anode of the tube T21, relay R101, to the conductor 14.

Thus it is to be noted from the timing diagram of Fig. 2*a* that prior to depressing the key to punch the highest order digit of the serial number in column one of the detail card, the relays R101, R116 and R114 will be in an energized condition due to the sensing of the "5" perforation in the program card and the closing of the switch 20. Since the serial number 1235 of the assumed problem bears a digit 1 in the highest order position, it will be necessary for the operator to depress the 1 key 16 (Fig. 1*a*) in order to enter this digit in the record card. The depression of this key will set up a pair of circuits. The first of these circuits which will cause the storage relay R107 (Fig. 1*c*) to be energized may be traced as follows: line 11 (Fig. 1*a*), conductor 95, card lever contacts R3*c* now closed, keyboard restore contacts 356 normally closed, conductor 18, the 1 key contacts 369 now closed, contacts R101*c* now closed, substitute relay contacts R102*a* as shown, conductor 37 (Figs. 1*a* to 1*b*), contacts R109*d*, R110*e*, R111*e* and R112*i*, all as shown, conductor 38, corresponding rectifier 39, conductor 40 (Figs. 1*b* to 1*c*), the relay R107, conductor 41, conductor 42, to the conductor 14. A hold circuit for relay R107 will be established by the cam controlled contacts P8 (Fig. 1*c*) which may be traced as follows; conductor 11 (Fig. 1*c*), conductor 16, contacts R1*d* as shown, cam controlled contacts P8 in a make position at this time as shown in the timing diagram of Fig. 2*a*, line 21, contacts R107*a* now closed, the hold coil of the relay R107, the 2500 ohm resistor 22, line 41, conductor 42, and then to conductor 14. It is to be noted that the relay R118 (Fig. 1*c*) which is in parallel with the hold coil of the relay R107 will also be picked up by cam controlled contacts P8 at this time.

The second circuit established when the 1 key contacts 369 are closed will be the same as just described up to contacts R101*c* (Fig. 1*a*), from which position it branches off to cause the energization of the 1 interposer magnet 188. As brought out in the aforementioned application of Gardinor et al. and as not shown in this application (now Patent 2,647,581), the energization of the 1 interposer magnet 188 unlatches its associated punch interposer which latches on the punch bail and closes the bail contacts. As the interposer bail contacts close they energize the escapement magnet 104 (Fig. 47*b* of the Gardinor application, now Patent 2,647,581) causing the program card to escape to column two while the detail card will escape to column one. Likewise as pointed out in the aforementioned Gardinor application, now Patent 2,647,581, the energization of the interposer magnet 188 will cause the punch clutch magnet 204 (Fig. 47*c* of the Gardinor application, now Patent 2,647,581) to be energized thereby initiating a punch clutch cycle, resulting in the digit 1 being punched in column one of the detail card in a manner as explained in the aforementioned Gardinor patent application, now Patent 2,647,581. It is also noted as described in the Gardinor application, now Patent 2,647,581 that the keyboard restore magnet 352 will be energized when the key is depressed. This circuit connection which is not shown in this application is shown in Figure 47*b* of the Gardinor application, now Patent 2,647,581.

When the program card escapes to column two the #5 star-wheel contacts will open causing the relay R116 (Fig. 1*b*) to be de-energized. Likewise when the program card escapes to column two the #12 star-wheel will detect a performation in the "12" index point position causing the corresponding contacts 246 (Fig. 1*b*) to be closed and thereby establishing a hold circuit for the relay R101. This hold circuit may be traced as follows: conductor 12 (Fig. 1*b*), normally closed error relay contacts R113*d*, #12 star-wheel contacts 246 now closed, contacts R24*b* normally closed, conductor 47 (Figs. 1*b* to 1*a*), rectifier 43, contacts R103*a* normally closed, R101*a* now closed the tube T21, the relay R101, to the conductor 14. The #4 star-wheel, upon detecting the "4" perforation in the second column of the program card, will close the corresponding contact 246 to complete a circuit for energizing the relay R117. This circuit may be traced as follows: conductor 12 (Fig. 1*b*), contacts R113*d* normally closed, #4 star-wheel contacts 246 now closed, the negatively biased tube T22, relay R117, contacts R25*d* normally closed, to the conductor 14. The energization of the relay R117 will close the corresponding contacts R117*c* (Fig. 1*a*) thereby establishing a circuit for energizing the substitute relay R102 (Fig. 1*a*). This circuit may be traced follows: line 11 (Fig. 1*c*), conductor 16, contacts R1*d* as shown, conductor 36 (Figs. 1*c* to 1*a*), contacts R116*c* as shown, R117*c* now closed, relay R102, and then to the conductor 14. The energization of the substitute relay R102 will cause the associated contacts to be transferred such that, during the second cycle when the 2 key 50 is depressed, the resulting pulse will be applied to the summation circuit of Fig. 1*b* as equivalent to the pulse applied when the 4 key 61 is depressed.

Whenever the substitute relay R102 (Fig. 1*a*) is energized it causes the next following key pulse to be re-routed into the summation circuit. The re-routing will cause the 1 key pulse to be applied to the summation circuit as equivalent to a 2 key pulse; a 2 pulse as equivalent to a 4 pulse; a 3 pulse as equivalent to a 6 pulse; a 4 pulse as equivalent to an 8 pulse; a 5 pulse as equivalent to a 1 pulse; a 6 pulse as equivalent to a 3 pulse; a 7 pulse as equivalent to a 5 pulse; an 8 pulse as equivalent to a 7 pulse. The 0 and 9 key pulses will not re-routed, substituted for, or converted to a different key pulse.

With the initiation of a punch clutch cycle, the punch shaft will rotate causing the cams P1, P2, P3, P4, P5, P6, P7, and P8 to make and break such as shown in the timing diagram of Fig. 2*a*. During the first cycle when the cam control contacts P3 make at 10° machine time, the keyboard restore interlock relay R115 (Fig. 1*b*) will be energized through an obvious circuit. The energization of this relay R115 closes the corresponding contacts R115*b* (Fig. 1*b*) which enable the circuit to be established for energizing the keyboard restore relay 352 (see Fig. 47*b* of the Gardinor application, now Patent 2,647,581). The circuit completed for energizing the keyboard restore relay 352 may be traced as follows: conductor 12 (Fig. 1*b*), conductor 43, conductor 44, now closed contacts R115*b*, the tube T1, the keyboard restore relay 352, and then to conductor 14. The keyboard restore interlock relay R115 retains the keyboard restore magnet 352 in an energized condition in order to prevent the operator from depressing a key in the middle of a cycle.

When the cam controlled contacts P6 make at 180° of the first cycle the 1 value standing in the storage relay R107 (Fig. 1*c*) will be transferred into the transfer storage relay R112 (Fig. 1*c*). This circuit may be traced from the line 44 (Fig. 1*c*) which is coupled to the contacts P6 as follows: line 58, contacts R103*g* normally closed, contacts R107*b* now closed, pick-up coil of the relay R112, conductor 45, conductor 42, to line 14. This circuit just traced will result in the relay R112 being energized. A hold circuit for the relay R112 is established by the cam controlled contacts P2 through the contacts R112*a* (Fig. 1*c*).

When the cam controlled contacts P8 break at 270° of the first cycle, the hold circuit for the relay R107 and the circuit for the relay R118 will be broken such as shown in the timing diagram of Fig. 2*a*. When P8 makes again at 340° of the first cycle the relay R118 will be picked up again. As described in the aforementioned Gardinor patent application (now Patent 2,647,581), at the end of the first cycle the punch clutch relatches thus causing the rotation of the punch shaft to be brought to a halt.

Prior to depressing the 2 key 50 (Fig. 1*a*) to commence the second cycle, it is to be noted from the timing diagram of Fig. 2*a* that the relays R114, R117, R101, R118, R102 and R112 are all in an energized condition. Now when the operator depresses the 2 key 50 in order to punch the next higher degit of the serial number in column two of the detail card, a pair of circuits will be established. As previously pointed out, one of the circuits will cause the 2 interposer magnet 188 (Fig. 1*a*) to be energized thereby causing the program card to escape to column three, the detail card to escape to column two, and the punch magnet to cause the digit 2 to be punched in the detail card after the detail card escapes to column two. The escapement of the program card to be third column will result in the #12 and #5 star-wheels detecting a perforation in the corresponding index positions. As previously described, the #12 star-wheel will, upon detecting the perforation in the "12" index position of the third column of the program card, close the corresponding contacts 246 (Fig. 1*b*) causing a hold circuit to be established for the relay R101. Also as previously pointed out, when the #5 star-wheel senses the "5" perforation in the third column of the program card the corresponding contacts 246 will be closed causing the relay R116 (Fig. 1*b*) to be energized, but inasmuch as the relay R101 is being held at this time, the completion of a circuit for the energization of the relay R116 will have no effect at this time. It is to be noted from the timing diagram of Fig 2*b* that when the program card escapes to column three, the relay R117 associated with the #4 star-wheel contacts will be de-energized which will in turn cause the de-energization of the substitute relay R102.

The second circuit which is established when the 2 key 50 is depressed may be traced as follows: conductor 11 (Fig. 1*a*), card lever contacts R3*c* now closed, contacts 356 normally closed, conductor 18, 2 key contacts 368 now closed, contacts R101*d* now closed, substitute relay contacts R102*b* shifted, conductor 25 (Figs. 1*a* to 1*b*), contacts R109*j*, R110*k*, and R111*k*, all as shown, R112*k* transferred, conductor 26, corresponding rectifier 39, line 52 (Figs. 1*b* to 1*c*), to the storage relay R104, conductors 53 and 42, to the conductor 14. The energization of the relay R104, which is equivalent to the value 5, is due to the summation of the substitute number 4, representative of the number 2, to the 1 value, as represented by the relay R112 being energized, which was entered in the first cycle. The storage relays R104, R105, R106, R107, and R108 are respectively equivalent to the values 5, 4, 2, 1, and 0. The transfer storage relays R109, R110, R111, and R112 (Fig. 1*c*) are respectively equivalent to the values 5, 4, 2, and 1.

As previously described, a hold circuit is established for the relay R104 when the cam controlled contacts P8 make. The energization of the interposer magnet will result in the unlatching of the punch clutch causing the rotation of the P cams such that, when the cam contacts P3 close at 10° of the second cycle, a circuit will be established for energizing the relay R115. As described previously, the energization of the relay R115 will close the corresponding contacts R115*b* (Fig. 1*b*) thereby causing a circuit to be completed for energizing the keyboard restore magnet 352. When the cam controlled contacts P2 break at 85° of the second cycle, the hold circuit for the relay R112 will be broken causing R112 to be returned to an un-energized condition as shown in the timing diagram of Fig. 2*b*.

At 180° of the second cycle when the cam controlled contacts P6 close, the value standing in the relay R104 will be transferred to the relay R109, which relay is representative of a 5 value. This circuit may be traced from the cam controlled contacts P6 conductor 44 (Fig. 1*c*) as follows: conductor 58 (Fig. 1*c*), contacts R103*g* normally closed, contacts R104*b* now closed, pick-up coil of the relay R109, conductor 42, to the line 14. A hold circuit for the relay R109 is established by the cam controlled contacts P2 through the corresponding contacts R109*a*. When the cam controlled contacts P8 break at 270° of the second cycle, relays R104 and R118 will be deenergized such as shown in the timing diagram of Fig. 2*b*. The relay R118 will be energized again at the end of the second cycle when the cam controlled contacts P8 make. The relay R115 will be de-energized at 270° machine time when the contacts P3 break.

At the end of the second cycle as shown in Fig. 2*b*, the relays R114, R101, R118, R116 and R109 will all be energized.

When the 3 key 60 is depressed by the operator to commence the third cycle, the corresponding 3 interposer magnet 188 (Fig. 1*a*) will be energized causing the program card to escape to column four, while the detail card will escape to column three in a manner as previously described. When the program card escapes to column four the relay R116 will be de-energized, while the #4 star-wheel will sense the "4" perforation in the fourth column of the program card. The sensing of the "4" perforation will cause the energization of the relay R117 (Fig. 1*b*) which, in turn, through the closing of the corresponding contacts R117*c* (Fig. 1*a*) will cause the substitute relay R102 to be energized.

Likewise when the 3 key 60 is depressed, a circuit will be established from line 11 (Fig. 1*a*) as follows: contacts R3*c* now closed, contacts 356 normally closed, 3 key contacts 367 now closed, R101*e* now closed, R102*c* as shown, line 27 (Figs. 1*a* to 1*b*), contacts R109*h* transferred, R110*h*, R111*h*, R112*f*, all as shown, line 28, a parallel circuit consisting of conductor 52 (Figs. 1*b* to 1*c*), relay R104 and line 53, conductor 63 (Figs. 1*b* to 1*c*), relay R106, line 64 and conductor 40, relay R107 and conductor 41, conductor 42, and then to the line 14. A hold circuit for these storage relays will be established when the cam controlled contacts P8 make. When the cam controlled contacts P2 break, the relay R109 will be de-energized as shown in the timing diagram of Fig. 2*b*.

Thus it is to be noted that the total of the first three digits of the serial number, with a 4 value having been substituted for the second digit, is now temporarily entered in the relays R104, R106 and R107 which are respectively representative of the values 5, 2 and 1, equal to a sum of 8.

At 180° of the third cycle the total standing in the relays R104, R106 and R107 will be transferred to the relays R109, R111 and R112. The circuit established enabling this transferring operation to take place is traceable from the line 44 (Fig. 1*c*) which is coupled to the cam controlled contacts P6 as follows: line 58, contacts R103*g* normally closed, parallel circuit consisting of R104*b* now closed and relay R109, contacts R106*b* now closed and relay R111, and contacts R107*b* now closed and relay R112, conductor 42, to the line 14. When the cam controlled contacts P8 (Fig. 1*c*) break at 270° of the cycle, the storage relays R107, R104 and R106 will be de-energized as will the relay R118. When the cam controlled contacts P8 make at 340° of the third cycle, the relay R118 will be energized again.

The fourth cycle is commenced by depressing the 5 key 66 which will result in the tens digit of the assumed postal money order serial number 1235 being punched in the fourth column of the detail card. The depressing of the key will result in the energization of the corresponding 5 interposer magnet 188 which in turn will cause the program card to escape to column five, while the detail card will escape to column four. When the program card escapes to the fifth column, the "12," "4" and "5" perforations present therein will be sensed by the corresponding star-wheel. The sensing of the "12" perforation by the #12 star-wheel will continue the hold circuit for the relay R101 (Fig. 1*a*). The sensing of the "4" perforation by the corresponding star-wheel will cause the energization of the relay R117 (Fig. 1*b*). The sensing of the "5" perforation by the corresponding star-wheel will cause the relay R116 (Fig. 1*b*) to be energized. It is to be noted that the substitute relay R102 (Fig. 1*a*) will not be energized this time inasmuch as the contacts R116*c* (Fig. 1*a*) will be open, thus preventing the circuit from being completed to energize the relay R102. Also when the 5 key 66 is depressed, a circuit will be established for energizing the storage relays R104 and R105 (Fig. 1*c*) which may be traced as follows: conductor 11 (Fig. 1*a*), contacts R3*c* now closed, contacts 356 normally closed, R101*g* now closed, R102*e* transferred, conductor 68, conductor 37 (Figs. 1*a* to 1*b*), contacts R109*d* transferred, R110*d* as shown, R111*d* transferred, R112*f* transferred parallel circuit consisting of line 69, conductor 52 (Figs. 1*b* to 1*c*), relay R104 and line 53, and conductor 70, line 71 (Figs. 1*b* to 1*c*), relay R105 and conductor 72, conductor 42, to the line 14.

Thus it is to be noted that at this time the sum of the four digits comprising the serial number 1235, where the second and fourth digits have had substituted therefore a 4 and a 1 digit respectively, is now stored in the relays R104 and R105. The relays R104 and R105 in an energized condition are respectively representative of the values 5 and 4.

As previously stated, the energization of the interposer magnet will cause the rotation of the punch cams through one complete cycle. Thus when the cam controlled contacts P3 make at 10°, the relay R115 (Fig. 1*b*) will be picked up which, in turn, will retain the keyboard restore magnet 352 in an energized condition. When the cam controlled contacts P2 break at 85° of the fourth cycle, the storage transfer relays R109, R111 and R112 will all be de-energized (see timing diagram of Fig. 2*c*). At 180° of the fourth cycle, when the cam controlled contacts P6 make, the values standing in the relays R104 and R105 will be transferred to the relays R109 and R110. This circuit is obvious from previous transferring operations.

At 270° of the fourth cycle the keyboard restore magnet will not be de-energized as previously. Instead it will be retained in an energized state by the contacts R116*d*, R117*d* and R114*b* (Fig. 1*b*). At 270° of the fourth cycle when the cam controlled contacts P8 break, the relays R104, R105 and R118 will be de-energized. When the relay R118 becomes de-energized, the contacts R118*b* (Fig. 1*a*) are returned to a normally closed position thereby enabling a circuit to be established for energizing the test relay R103 (Fig. 1*a*). This circuit may be traced as follows: line 11 (Fig. 1*c*), conductor 16, contacts R1*d* normally closed, conductor 36 (Figs. 1*c* to 1*a*), contacts R116*b* now closed, R117*b* now closed, R118*b* normally closed, relay R103, conductor 31, to the line 14. When the relay R103 becomes energized the hold circuit established for the relay R101 through contacts R103*a* (Fig. 1*a*) will be broken, thus returning the relay R101 (Fig. 1*a*) to a de-energized state.

After the relay R103 has been energized a hold circuit will be established by the cam controlled contacts P8. This circuit may be traced from conductor 16 (Fig. 1*c*) as follows: contacts R1*d* normally closed, conductor 36, cam controlled contacts P8 now closed, line 21, conductor 74 (Figs. 1*c* to 1*a*), contacts R103*i* now closed, the hold coil of the relay R103, conductor 75, to the conductor 14. With the relay R103 being energized, the associated contacts R103*c* (Fig. 1*b*) will close thereby enabling a circuit to be established through contacts R114*c* (Fig. 1*b*) for energizing the tube T14 (Fig. 1*c*), which in turn will cause the relay R26 (Fig. 1*c* here—Fig. 47*c* in the Gardinor application, now Patent 2,647,581,) to be energized. As pointed out in the Gardinor patent application, now Patent 2,647,581 and which is not shown in this application, a hold circuit will be established for the relay R26 (Fig. 47*c* of the Gardinor patent application, now Patent 2,647,581) which will energize the tube T6 and as a result hold the relay R26 in an energized condition. With the cam controlled contacts P2 in a make position and the contacts R26*d* (Fig. 47*c* of the Gardinor patent application, now Patent 2,647,581) now closed, a circuit will be established for energizing the relay R2. The relay R2 will be held by its contacts R2*c*. (This portion of the Gardinor circuit is shown here in Fig. 1*c*). The energization of the relay R2 closes the contacts R2*a* (Fig. 47*c* of the Gardinor patent application, now Patent 2,647,581), thereby enabling a circuit to be established for energizing the punch clutch magnet 204.

The energization of the punch clutch magnet will initiate another cycle, the fifth cycle, but it will not be accompanied by an escapement. In the fifth cycle when the cam controlled contacts P3 make at 10°, the values standing in the transfer storage relays R109 and R110 will be transferred to the relays R104 and R105. The circuit enabling this transferring operation to take place may be traced from the cam controlled contacts P3 conductor 77 (Fig. 1*a*) as follows: conductor 32, contacts R103*h* shifted, R114*e* shifted, conductor 78 (Figs. 1*a* to 1*b*), R109*b* shifted, R110*b* shifted, conductor 79, parallel circuit consisting of conductor 69, line 52 (Figs. 1*b* to 1*c*), relay R104 and line 53, and conductor 70, line 71 (Figs. 1*b* to 1*c*), relay R105 and line 72, conductor 42, to the conductor 14. A hold circuit will be established by the cam controlled contacts P8 through contacts associated with these relays.

Likewise when the cam controlled contacts P3 make at 10° of the fifth cycle, a circuit will be established through contacts R2*b* to energize the relay R25 (Fig. 47*c* of the Gardinor patent application, now Patent 2,647,581). When the cam controlled contacts P2 break at 85° of the fifth cycle the relays R109, R110 and R2 will be de-energized.

At 86° of the fifth cycle the cam controlled contacts P5 will make thereby enabling a circuit to be established for reading out the tens complement of the value stored in the relays R104 and R105. This circuit may be traced from the cam controlled contacts P5 conductor 33 (Fig. 1*a*) as follows: contacts R114*d* now closed, R103*e* now closed, R108*c* as shown, R104*c* shifted, R105*c* transferred, conductor 80, the 1 interposer magnet 188, conductor 34, and then to the conductor 14. The energization of the 1 interposer magnet 188 will, as now understood, initiate a normal punch cycle which will result in the key number 1 being punched in the fifth column of the record card.

It has been seen how the key or check number is originated by the applicant's device. The manner in which a previously prepared serial number having a key or check number appended thereto is checked for accuracy will now be described.

The initial step taken in preparing the applicant's circuit for a checking operation is that of opening the switch 20 (Fig. 1*c*) so as to prevent the relay R114 from being energized. It is recalled that the switch 20 is closed during an operation for originating the key number.

Similarly to that as previously described, the first four digits are successively keyed in resulting in the relays R109 and R110 (Fig. 1*c*), jointly representative of the value 9, and the test relay R103 (Fig. 1*a*) being energized such as shown in the timing diagram of Fig. 2*c*. Inasmuch as the relay R114 is de-energized during this checking operation, the relay R101 (Fig. 1*a*) will still be held in an energized condition through the normally closed contacts R114*a* and the now closed contacts R101*a* (Fig. 1*a*). Likewise with relay R114 in a de-energized condition, a punch clutch cycle will not be initiated at the time the relay R103 becomes energized, as was the case in the originating operation, inasmuch as the normally open contacts R114*c* (Fig. 1*b*) will prevent a circuit from being completed to the tube T14 (Fig. 1*c*).

The fifth cycle in the checking operation will be initiated by depressing the 1 key 16 (Fig. 1*a*), representative of the check digit, which will cause the units digit of the serial number to be punched in the card, as well as being added to the total standing in the relays R109 and R110. If the serial number is correct the resulting total will be zero, as represented by the relay R108 (Fig. 1*c*) being energized. But if the serial number entered is incorrect, the relay R108 (Fig. 1*c*) will not be energized while the error relay R113 (Fig. 1*c*) will be energized resulting in further operations being halted.

Now the depressing of the 1 key 16 (Fig. 1*a*) will close the corresponding contacts 369 causing a pair of circuits to be established. The first circuit will cause the 1 interposer magnet 188 to be energized which, in turn, will cause the program card to skip to column six and the record card to column five, as well as initiating a punch clutch cycle resulting in a "1" being punched in column five of the record card. Since the program card is blank in column six, the relays R101 (Fig. 1*a*), R116, and R117 (Fig. 1*b*) will all be returned to a de-energized condition.

The second circuit established when the 1 key 16 is depressed may be traced from the corresponding now closed contacts 369 (Fig. 1*a*) as follows: contacts R101*c* now closed, line 37 (Fig. 1*a* to Fig. 1*b*), contacts R109*d* and R110*d* transferred, line 83, corresponding rectifier 39, conductor 84 (Figs. 1*b* to 1*c*), conductor 84, pick-up coil of the relay R108, conductor 85, line 42, to the line 14. A hold circuit is established for the relay R108 through its contacts R108*a* (Fig. 1*c*) by the cam controlled contacts P7 (Fig. 1*c*).

If the relay R108 is not energized at this time of the fifth cycle thereby indicating that the serial number keyed in is incorrect then when the cam controlled contacts P3 make at 10° a circuit will be completed for energizing the error relay R113 (Fig. 1*c*). This circuit may be traced from the line 77 (Fig. 1*c*) which is coupled to the cam controlled contacts P3 as follows: conductor 87 (Fig. 1*c*), contacts R103*d* now closed, R108*b* and R114*f* as shown, pick-up coil of the error relay R113, conductor 88, and then to the line 14. A hold circuit for the error relay R113 is set up through the contacts R1*d* and R113*e* (Fig. 1*c*). The completion of the hold circuit for relay R113 will also cause the lamp 89 to light thereby visually indicating an error. When the error relay R113 is energized, the contacts R113*d* (Fig. 1*c*) open which will interrupt all program signals until the error has been cleared.

During the fifth cycle of the checking operation, any value standing in the storage relays R104, R105, R106, R107, and R108 (Fig. 1*c*) will not be transferred to the corresponding one of the transfer storage relays R109, R110, R111, and R112 (Fig. 1*c*) when the cam controlled contacts P6 make inasmuch as the contacts R103*g* (Fig. 1*c*) will be open at this time. The hold circuit for the relay R108 will be broken when the cam controlled contacts P8 break at 270° time during the fifth cycle thereby leaving the machine clear for the next problem.

In order to release the record card in which the erroneous serial number has been punched, the operator will close the error release key 92 (Fig. 1*c*) which will enable a circuit to be established through the now closed contacts R113*e* (Fig. 1*c*) for energizing the relay R119 (Fig. 1*c*). The energization of the relay R119 will close the contacts R119*b* (Fig. 1*c*) thereby enabling an obvious circuit to be established for energizing the release relay R1 (Fig. 1*c*), and the contacts R119*a*( Fig. 1*c*) for setting up a hold circuit for the relay R119 through the now closed contacts PR3 (Fig. 1*c*). The contacts PR3, as described in the Gardinor application, now Patent 2,647,-581, are normally closed until the program drum has been advanced a column and a half past the 80th column position when they are opened and then restored six and a half columns later. The energization of the release relay R1 will cause the card to escape through column 80 in a manner such as described in the Gardinor application, now Patent 2,647,581.

The energization of the release relay R1 will open the contacts R1*d* (Fig. 1*c*) causing the relays R103 (Fig. 1*a*) and R113 (Fig. 1*c*) to be de-energized. The breaking of the contacts PR3 will break the hold circuit for the card lever relay R3, the relay R119 and relay R1 (Fig. 1*c*) thereby restoring these relays to a de-energized state.

At the time that the contacts PR3 (Fig. 1*c*) break, the contacts PR2 (Fig. 1*c*) make to establish a circuit through the normally closed contacts R113*c* and R23*b*(Fig. 1*c*) to the control grid of the tube T5 (Fig. 1*c* here—Fig. 47*c* of the Gardinor application, now Patent 2,647,581). The completed circuit will render the tube T5 conductive causing the relay R24 to be energized resulting in an automatic releasing of the erroneous punched card in the manner as described in the Gardinor application, now Patent No. 2,647,581. It is to be noted that the contacts R113*c* in this circuit will prevent an automatic release of the card whenever an error should occur in column 80. As soon as the error is detected, the error relay R113 will be energized causing the contacts R113*c* to open thus preventing an automatic release of the record card in such a situation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus of the class described, a group of entry receiving relays respectively representative of the numbers 5, 4, 2 and 1, means for successively entering digits of a multidenominational amount in said relays by the energization of said relays singly or in combination, means for enabling alternate digits of said amount to be entered in substitute form pursuant to a definite rule, said rule requiring the digits 0, 1, 2, 3, 4, 5, 6, 7, 8 and 9 to be respectively substituted by the digits 0, 2, 4, 6, 8, 1, 3, 5, 7 and 9, said relays progressively registering the units sum of said entered digits, and means controlled by said relays for reading out the complement of the units sum standing in said relays after the last digit of said amount has been entered into said relays.

2. In a calculating machine, the combination of means adapted to enter a multidigit amount in said machine, the units and alternate digits of said amount being entered in a predetermined substitute form while the tens and alternate digits are entered in original form, and means for computing the units digit of the sum of said entered digits.

3. In a calculating machine, the combination of means for entering a multidigit number in said machine, the alternate digits of said number being entered in substitute form pursuant to a definite rule, and means to obtain the sum of said digits of said number without tens carries.

4. In a calculating machine, the combination of means for entering a multidigit number in said machine, the alternate digits of said number being entered in substitute form pursuant to a definite rule, and means to obtain the sum of said digits of said number with a predetermined value and multiples thereof, cast out.

5. In a calculating machine, the combination of number entering mechanism, means for substituting according to a predetermined plan, a different valued number for alternate digits of said number, and means to obtain the algebraic summation without tens carries of the entered digits.

6. In a calculating machine, the combination of means adapted to enter a multidigit amount in said machine, means for substituting according to a predetermined plan a different value digit for alternate digits of said amount, means for determining the algebraic summation without tens carries of the entered digits, and means for obtaining the complement of said algebraic summation.

7. In a calculating machine, a set of settable devices comprising a plurality of relays respectively representative of the numbers 5, 4, 2 and 1, means for successively entering a multidenominational amount digit by digit in said devices, means prior to the entry of the alternate digits of said amount in said devices for substituting for said alternate digits such that a 0 will be substituted for a 0, a 2 for a 1, a 4 for a 2, a 6 for a 3, an 8 for a 4, a 1 for 5, a 3 for a 6, a 5 for a 7, a 7 for an 8, and a 9 for a 9, said devices progressively registering the units sum of said entered digits, and means controlled by said devices upon entering the last digit of said amount for reading out the complement of the units sum standing in said devices.

8. In a calculating machine, the combination of an electrical summation circuit, means to enter an amount in said circuit, means for modifying said entered amount by substituting pursuant to a predetermined plan other digits for alternate digits of said amount, means for registering the algebraic summation without tens carries of the digits of said modified amount, and means controlled by said last mentioned means for producing a self-checking digit for said amount, the sum of said self-checking digit and said algebraic summation being zero.

9. In combination, a group of entry receiving devices, means for successively entering the digits of a multidenominational amount in said devices, the units and alternate digits being entered in a predetermined substitute form while the tens and alternate digits are entered in true form, said devices progressively registering the units sum of said digits, and means controlled by said devices for reading out the complement of the units sum standing in said devices after the last digit of said amount has been entered into said devices.

10. In a calculating machine, the combination of an electrical summation circuit, means for entering a multidigit amount in said circuit, the alternate digits of said amount being entered in substitute form pursuant to a definite rule, means controlled by said circuit for registering the algebraic summation without tens carries of the entered digits.

11. In combination, a group of entry receiving relays which by energization singly or in combination may represent all of the digits 1 to 9, means for successively entering digits of a multidenominational amount in said relays, means for enabling the units and alternate digits of said amount to be entered in substitute form pursuant to a definite rule, said relays progressively registering the units sum of said digits, and means controlled by said relays for reading out the complement of the units sum standing in said relays after the last digit of said amount has been entered into said relays.

12. In an apparatus of the class described, punch operating means, a set of settable devices comprising a plurality of relays for representing digital values in code, means for successively entering the digits of a multidenominational amount in said devices, means for converting alternate digits of said amount prior to being entered in said devices, said alternate digits being converted pursuant to a predetermined plan, said devices progressively registering the units sum of said entered digits, and means controlled by said devices for effecting said punch means in accordance with the complementary value of the units sum standing in said devices after the last digit of said amount has been entered into said devices.

References Cited in the file of this patent

UNITED STATES PATENTS

| | | |
|---|---|---|
| 2,386,763 | Williams | Oct. 16, 1945 |
| 2,425,549 | Luhn | Aug. 12, 1947 |
| 2,552,760 | Baker | May 15, 1951 |